United States Patent [19]

Nakagawa et al.

[11] 4,253,617

[45] Mar. 3, 1981

[54] SPEED GOVERNOR FOR A DISPOSABLE DATA RECORDER

[76] Inventors: George Nakagawa, Robert M. Nakagawa, both of 1812 Dakota Ave., Modesto, Calif. 95351

[21] Appl. No.: 76,314

[22] Filed: Sep. 17, 1979

[51] Int. Cl.$^3$ .................. B65H 17/02; B65H 75/48
[52] U.S. Cl. .................................. 242/55; 73/343.5; 185/37; 242/67.3 R; 242/107.3; 346/33 TP; 346/136
[58] Field of Search .......... 242/107.3, 107.2, 67.3 R, 242/67.1 R, 47.5, 55, 55.01, 75, 107, 75.5; 73/343.5; 346/33 TP, 73, 136; 40/517, 520; 185/5, 9, 38, 37, 40 R-40 S, 39; 188/266, 317; 160/294, 296, 305, 313; 182/233, 238

[56] References Cited

U.S. PATENT DOCUMENTS

| | | | |
|---|---|---|---|
| 2,060,833 | 11/1936 | Smith | 185/38 |
| 2,838,259 | 6/1958 | Cotton | 188/317 X |
| 3,175,517 | 3/1965 | Wiedermann | 242/107.3 X |
| 3,688,626 | 9/1972 | Cotey | 185/38 X |
| 3,826,140 | 7/1974 | Nakagawa et al. | 73/343.5 |
| 3,971,035 | 7/1976 | Maxwell | 346/33 TP |
| 4,007,637 | 2/1977 | Nakagawa | 73/343.5 |

Primary Examiner—John M. Jillions
Attorney, Agent, or Firm—Roger B. Webster

[57] ABSTRACT

A speed governor for a disposable spring motor driven data recorder of the type which is used, for example, in a railroad car to graphically record, on a traveling tape, the temperature in the car at all times during a transit period of several days; the speed governor comprising a mechanical-hydraulic mechanism associated with the spring motor and operative to control—to a constant but extremely slow rate—the speed of travel of the tape.

10 Claims, 8 Drawing Figures

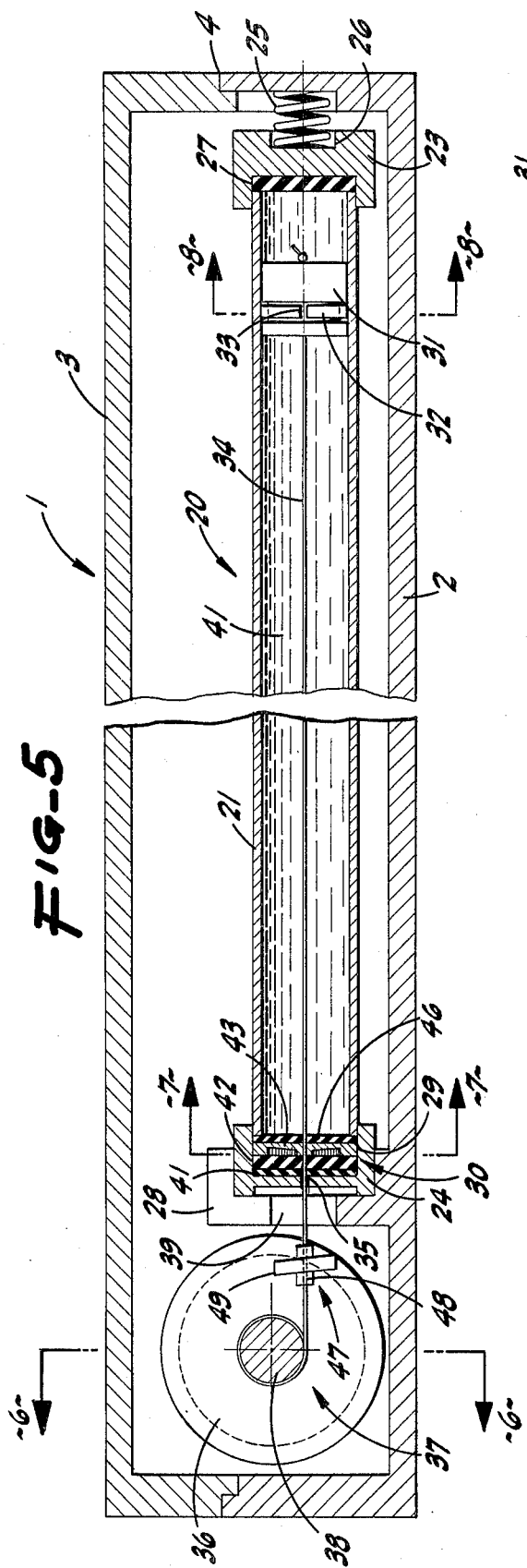
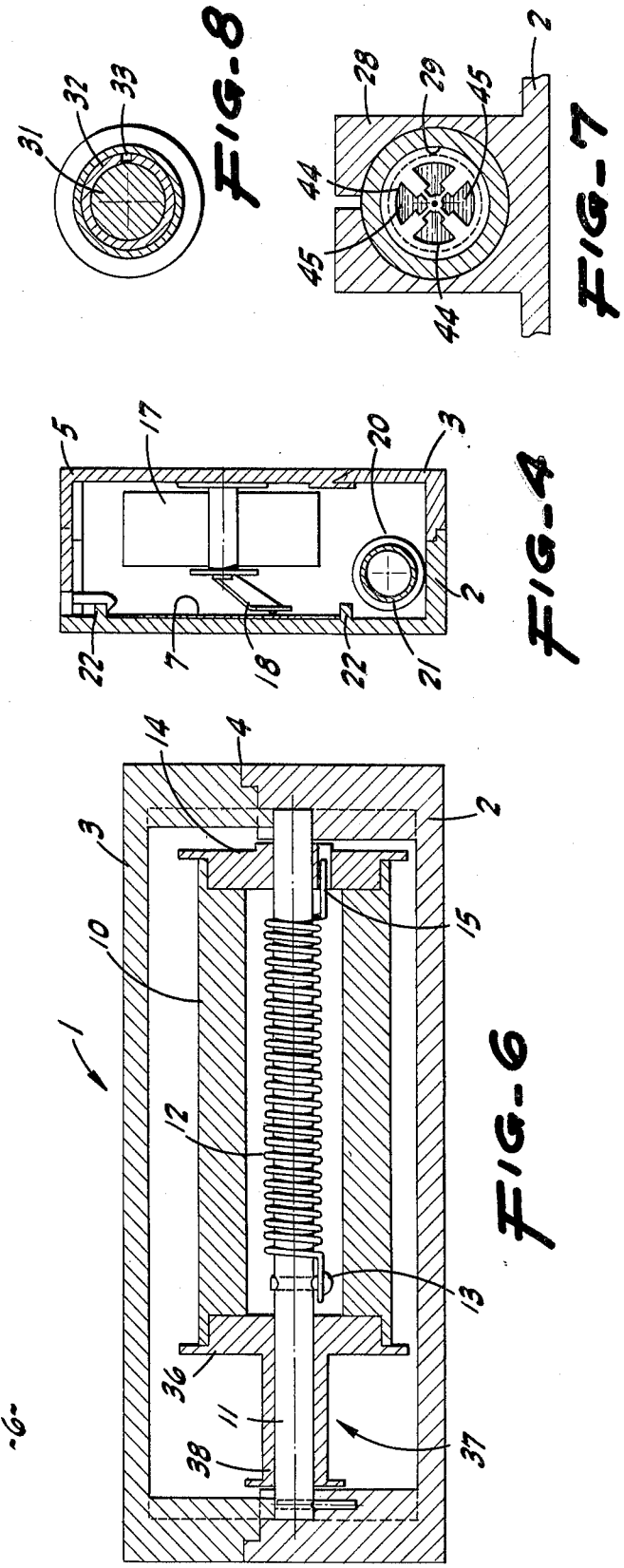

SPEED GOVERNOR FOR A DISPOSABLE DATA RECORDER

BACKGROUND OF THE INVENTION

1. Field of the Invention

Spring motor driven data recorders operative to continuously graphically record, on a traveling tape and over a time span, data such as temperature are known; such recorders, of necessity, including speed governors to control—to a constant but very slow rate—the speed of travel of the tape. The present invention was conceived in a successful effort to provide a speed governor—for such purpose—which meets the requirements of ready and economical manufacturing practices, and operative effectiveness.

2. The Prior Part

U.S. Pat. No. 4,007,637, issued to applicants, is representative of the prior art known to them.

SUMMARY OF THE INVENTION

The present invention is directed to, and it is a major object to provide, a simple, compact, highly effective speed governor in a spring motor driven data recorder of the type which is used, for example, in a railroad car to graphically record, on a traveling tape, the temperature in the car at all times during a transit period of several days; the speed governor comprising a mechanical-hydraulic mechanism associated with the spring motor and operative to control—to a constant but extremely slow rate—the speed of travel of the tape.

The present invention provides, as another important object, a speed governor, as above, which includes, in novel combination, a windlass connected to the spring motor and arranged in winding relation relative to a flexible filament connected axially to a hydraulically motion-retarded piston close fitting but slidable in a straight, elongated, cylindrical tube; the tube containing a very viscous liquid through which the piston is slowly advanced, in the tube, under the tension of the filament as wound on the windlass.

The present invention provides, as a still further object, a practical and reliable speed governor for a disposable data recorder, and one which is exceedingly effective for the purpose for which it is designed.

BRIEF DESCRIPTION OF THE DRAWINGS

FIG. 4 is a section taken substantially on line 4—4 of FIG. 1.

FIG. 5 is a section taken substantially on line 5—5 of FIG. 3.

FIG. 6 is a section taken substantially on line 6—6 of FIG. 5.

FIG. 7 is a fragmentary section taken substantially on line 7—7 of FIG. 5.

FIG. 8 is a fragmentary section taken substantially on line 8—8 of FIG. 5.

DESCRIPTION OF THE PREFERRED EMBODIMENT

Figure 1:
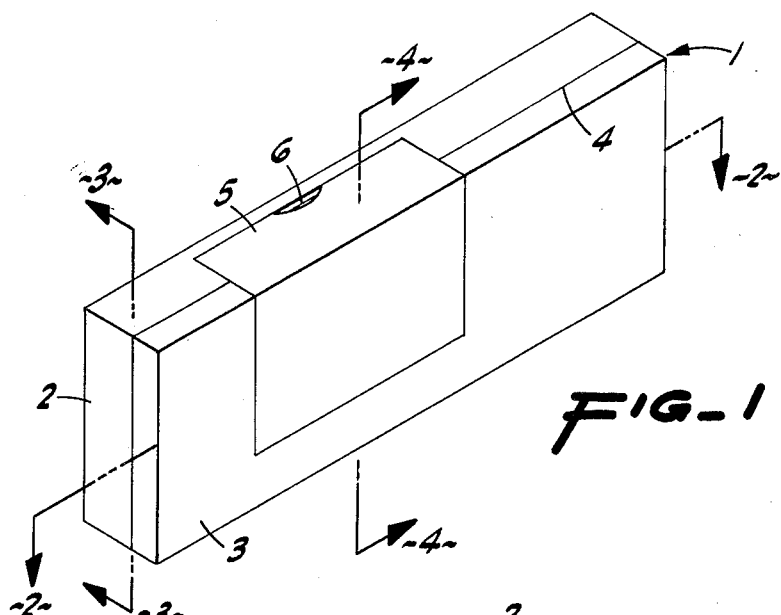
FIG. 1 is a perspective view of the disposable data recorder; the view showing the recorder disposed—for the purpose of the present drawings—longitudinally on edge. However, in use the recorder may be mounted in any selected position.
Figure 2:
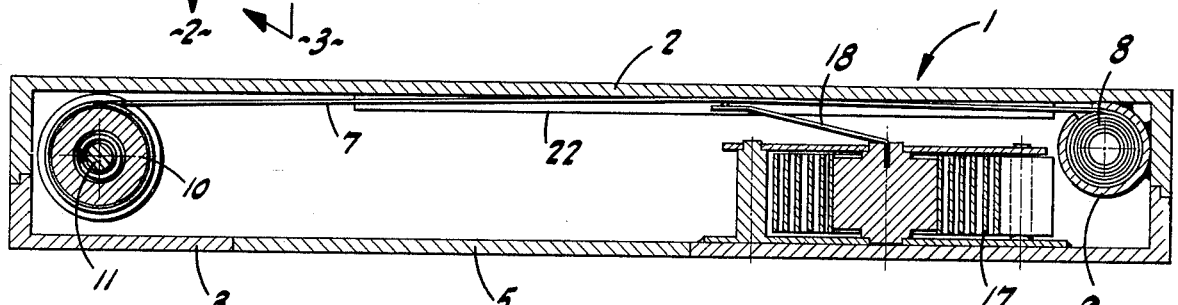
FIG. 2 is a section taken substantially on line 2—2 of FIG. 1.
Figure 3:
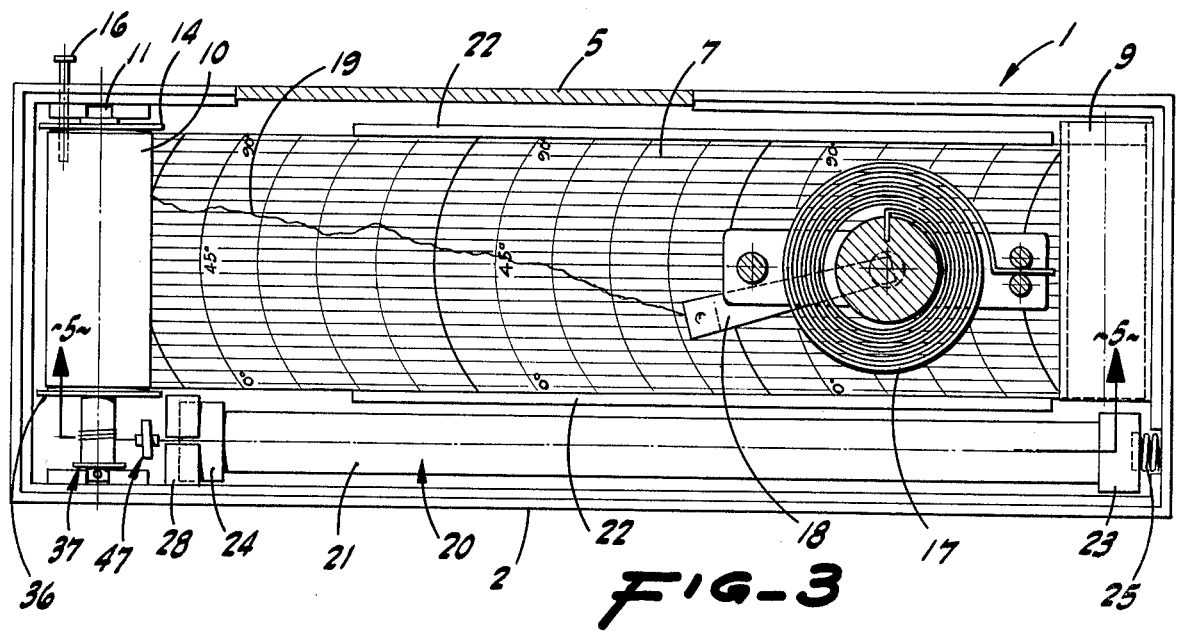
FIG. 3 is a section taken substantially on line 3—3 of FIG. 1.

Referring now more particularly to the drawings and to the characters of reference marked thereon, the speed governor (as hereinafter described in detail) is embodied in a disposable data recorder which includes an elongated, rectangular, hollow housing indicated generally at 1, and which is comprised of initially separate housing sections 2 and 3 which—upon assembly of the recorder—are permanently adhesively secured together at the mating line 4. The housing includes a normally closed, removable hatch 5 which is adapted to be removed (after use of the recorder) by insertion of a pry tool (or coin) in a notch 6. The reason for access to the interior of the housing 1, upon removal of hatch 5, will later appear.

A run of flat, relatively wide, pressure-sensitive tape 7 extends in the housing section 2 from substantially end to end thereof—feeding from a roll 8 in a slotted, cylindrical carrier 9 mounted transversely in one end of section 2 to a spring motor driven take-up spool 10 journaled on a non-rotatable, transverse shaft 11 fixed in the other end of section 2.

A helically wound spring motor 12 surrounds the fixed shaft 11 within the confines of the take-up spool 10 and which is hollow intermediate its ends. One end of the spring motor 12 is anchored to the shaft 11, as at 13, while the other end of the spring motor 12 is anchored to an end 14 of the take-up spool 10, as at 15.

The spring motor 12 is initially tight-wound or fully loaded, but is prevented from rotating the spool 10 by reason of a pull pin 16 which extends through the housing and into a receiving hole in the spool end 14.

A temperature-responsive device 17—of bimetallic helical type—is mounted in housing section 3 in a position centrally of the sides of tape 7, but spaced from the latter; the temperature-responsive device 17 including a pivotally mounted, longitudinal scribing stylus 18 which bears, in sweeping relation, on and produces a graphically scribed temperature recording line 19 on the pressure-sensitive tape 7 as it travels from roll 8 to the take-up spool 10 upon said spool (after pulling of pin 16 to initiate operation of the recorder) being rotated by the spring motor 12.

The speed of travel of the tape 7 is controlled to a constant but extremely slow rate by a governor, indicated generally at 20, associated with the take-up spool 10 and limiting the speed of rotation of the latter to an extent that the full length of tape 7 is advanced to take-up spool 10 over a time span of a number of days—for example, at least the transit time of a refrigerated railroad car in which the recorder is used.

After such time span has elapsed, as at the destination of the refrigerated railroad car, the hatch 5 is removed from housing 1 whereby to provide manual access to the tape 7, and which then graphically reflects a continuous and sequential record of the temperature in the railroad car during the time it was in transit.

The governor 20, which assures—for the purpose of accuracy—of the requisite control of the speed of the tape to an extremely slow, constant rate, is constructed and functions as follows:

An elongated metallic tube 21 is disposed in housing section 2 along one side of the run of tape 7, and which run is confined between longitudinal guides 22; the tube being close-fitted with cup-like end caps; the sealed rear cap being indicated at 23, and the front cap at 24. The tube 21, which lies laterally of one of the tape guides 22, is supported, and axially spring-pressed at the rear, by a compression spring 25 engaged under load between the corresponding end of section 2 and the rear cap 23, with the spring seated in a cavity 26 in said rear cap. A rubber end closure gasket 27 in rear cap 23 provides a seal against the rear end of the tube 21.

The front cap 24 (and consequently the front end of the tube 21) is supported by a clamping block 28 formed in housing section 2 and provided with a bore 29 in which the front cap seats in matching relation.

A seal array, indicated generally at 30, is disposed in the front cap 24 and is engaged by the front end of the tube 21; the details and function of such seal array to later appear.

The metallic (steel) tube 21 is internally "ball-sized" and fine-honed to an exact internal diameter, and a piston 31 is machine fitted to a close but sliding tolerance in the tube 21; the piston—which is initially disposed adjacent the rear of the tube—being circumferentially grooved and carrying in the groove a split piston ring 32 whose ends, at the split, are in closely adjacent but slightly spaced relation to define a gap 33.

A flexible, small gauge, monofilament line 34 (as of nylon) is secured centrally to the piston 31, extends forwardly therefrom in the tube 21, is threaded axially through the seal array 30, and thence leads from the front cap 24 through a center hole 35 in the latter.

The end 36 of take-up spool 10 is formed with a small, integral, axially projecting windlass 37 which occupies a position directly ahead of, and in spaced relation to, the front cap 24 and supporting block 28; the windlass including a hub 38 turnable on the fixed shaft.

Ahead of the front cap 24, the flexible line 34 passes through a center port 39 in supporting block 28, and thence runs to the windlass 37 and is connected in winding relation thereto by attachment to the hub 38.

The tube 21 is filled with a high viscosity (dimethyl-polysiloxane) fluid 40 having a relatively flat temperature to viscosity profile; such high viscosity fluid 40 having the effect of greatly retarding forward movement of the piston 31 in the tube 21 in response to tension or pull imposed on line 34 as it is wound on the windlass 37 in response to rotation of the take-up spool 10. More particularly, upon such tension or pull on the line from windlass 37, the piston 31 is urged forwardly or advnaced in the tube 21, but such movement is exceedingly slow not only because of the viscosity of the fluid in the tube, but also the fact that such viscous fluid must flow through the restricted gap 33 in piston ring 32 as the fluid displaces in the tube from ahead to the rear of said piston 31.

Consequently, the very slow advance of the piston 31 in tube 21 prevents the spring motor driven spool 10 from rotating at other than a very slow speed, and which results in the desired extremely slow rate of travel of the tape—all for the purpose described.

In order to assure against leakage of the viscous fluid 40 from the front cap 24 during use of the recorder and operation of governor 20 (with piston 31 advancing in tube 21), the seal array 30 is provided and which is constructed as follows:

A medium density, solid rubber, circular seal 41 is die-cut to the outside diameter of the tube and rests against the closed end of the front cap 24, and a medium density, sponge rubber, circular seal 42—likewise die-cut and of the same diameter—is seated against the backside of seal 41. Rearwardly of, but in facing engagement with the sponge rubber seal 42, is a molded, circular disc 43; the face of such disc (which engages seal 42) being formed with a plurality of equally circumferentially spaced, substantially pie-shaped pockets 44 open at the radially inner ends to the line 34 in the center of the seal array 30. The pockets 44 of disc 43 taper or decrease in depth radially inwardly and are filled with a grease-like material 45, and said disc 43 is backed by a circular, rubber gasket 46.

When the recorder is in use, with the piston slowly advancing in the tube 21, the pressure exerted by the fluid 40 on the seal array 30 causes the sponge rubber seal 42 to exert a pressure on the grease-like material 45 in pockets 44, and—because of the taper of said pockets—such grease-like material is foced radially inwardly and produces an effective seal with line 34. This, together with the cumulative seal effect, provided by all the components of the seal array 30, prevents leakage of fluid 40 at the front cap 24.

A small "off-balance" weight unit 47 is disposed on the line 34 intermediate the front cap 24 and the windlass 37; such weight unit 47 including an axial sleeve 48 through which the line is threaded, and a weight disc 49 is formed integrally on the sleeve 48 diagonally thereof. The purpose of the weight unit 47 is to recurringly, in response to in-transit motion of the railroad car, impart a slight jouncing or shaking to the line 34, and which prevents the piston 31 from "hanging up" in the tube 21 when the recorder is in use.

From the foregoing description, it will be readily seen that there has been produced such a speed governor for a disposable data recorder as substantially fulfills the objects of the invention, as set forth herein.

While this specification sets forth in detail the present and preferred construction of the speed governor for a disposable data recorder, still in practice such deviations from such detail may be resorted to as do not form a departure from the spirit of the invention as defined by the appended claims.

We claim:

1. A speed governor, for a disposable data recorder which includes a spring motor rotated, tape take-up spool, comprising a windlass connected to and rotated by the spool, a flexible line attached to the windlass in winding-on relation, and means associated with and operative to yieldably resist motion of the line toward the windlass whereby to retard spring motor rotation of the spool.

2. A speed governor, as in claim 1, in which the windlass is formed in integral relation with one end of the spool.

3. A speed governor, as in claim 1, in which the line motion resisting means includes an elongated, closed-end tube have a viscous fluid therein, a piston in the tube, the line being attached to the piston and extending in sealed but slidable relation out of the tube from one end thereof to attachment to the windlass, the piston initially being adjacent the other end of the tube, and the piston having a restricted passage therein to permit limited flow of the viscous fluid through the piston with resultant slow advance of the latter in the tube.

4. A speed governor, as in claim 3, in which the tube is fixedly mounted relative to the windlass, with said one end of the tube adjacent thereto.

5. A speed governor, as in claim 4, in which the flexible line includes a portion free-spanning between said front end of the tube and the windlass, and a line-jouncing weight affixed to said portion of the line; jouncing of the line preventing the piston from "hanging up" in the tube.

6. A speed governor, as in claim 5, in which the line-jouncing weight includes a sleeve through which the line is threaded, and a disc weight formed on and radiating from the sleeve.

7. A speed governor, as in claim 6, in which the disc weight is disposed diagonally of the sleeve.

8. A speed governor, as in claim 3, embodying a front end cap on the tube, and a cylindrical seal array between the front end of the tube and said cap, and the flexible line being threaded axially through the seal array and the cap; said seal array including a circular seal of compressible material, and a disc backing the circular seal in engagement therewith, the disc having a plurality of circumferentially spaced pockets opening to the face of the disc and to which pockets the line is exposed, and a grease-like material in the pockets adapted to be placed under compression and form a seal with the line upon the disc being fluid-pressure-urged against the compressible material of said circular seal.

9. A speed governor, as in claim 8, in which the pockets are generally pie-shaped, and decrease in depth radially inwardly.

10. A speed governor, as in claim 1, in which the line-motion-resisting means comprises a straight, elongated, closed end tube mounted in a fixed position with one end of said tube adjacent the windlas, a viscous fluid in the tube, a piston in the tube, the piston initially being disposed in the tube adjacent the other end thereof, a seal array at said one end of the tube, the flexible line being attached to the piston and therefrom extending to and being threaded through the seal array, the line thence extending from said one end of the tube to attachment to the windlass, and the piston having a restricted passage therein to permit limited flow of the viscous liquid through the piston with resultant slow advance of the latter in the tube.

* * * * *